United States Patent [19]

Brown

[11] Patent Number: 4,620,565
[45] Date of Patent: Nov. 4, 1986

[54] INTEGRATED THREE WAY AND ISOLATION SOLENOID VALVE

[75] Inventor: G. Emerson Brown, Niles, Mich.

[73] Assignee: Allied Corporation, Morristown, N.J.

[21] Appl. No.: 771,550

[22] Filed: Sep. 3, 1985

[51] Int. Cl.<sup>4</sup> ............................................. F15B 13/044
[52] U.S. Cl. .......................... 137/596.17; 137/625.65; 251/129.14; 303/119
[58] Field of Search ............. 137/596.17, 625.65; 251/129.14; 303/119

[56] References Cited

U.S. PATENT DOCUMENTS

| 3,837,710 | 9/1974 | Reinecke et al. | 303/119 |
| 4,050,749 | 9/1977 | Harries | 303/119 |
| 4,175,794 | 11/1979 | Pauwels | 303/119 X |

Primary Examiner—Gerald A. Michalsky
Attorney, Agent, or Firm—Ronald D. Welch; Ken C. Decker

[57] ABSTRACT

An integrated solenoid actuated control valve useful in a fluid system such as an anti-lock braking system. The valve incorporates a solenoid actuated valve and a sliding valve responsive to differential pressure to provide fluid pressure isolation, build, and decay control in a single valve assembly.

14 Claims, 4 Drawing Figures

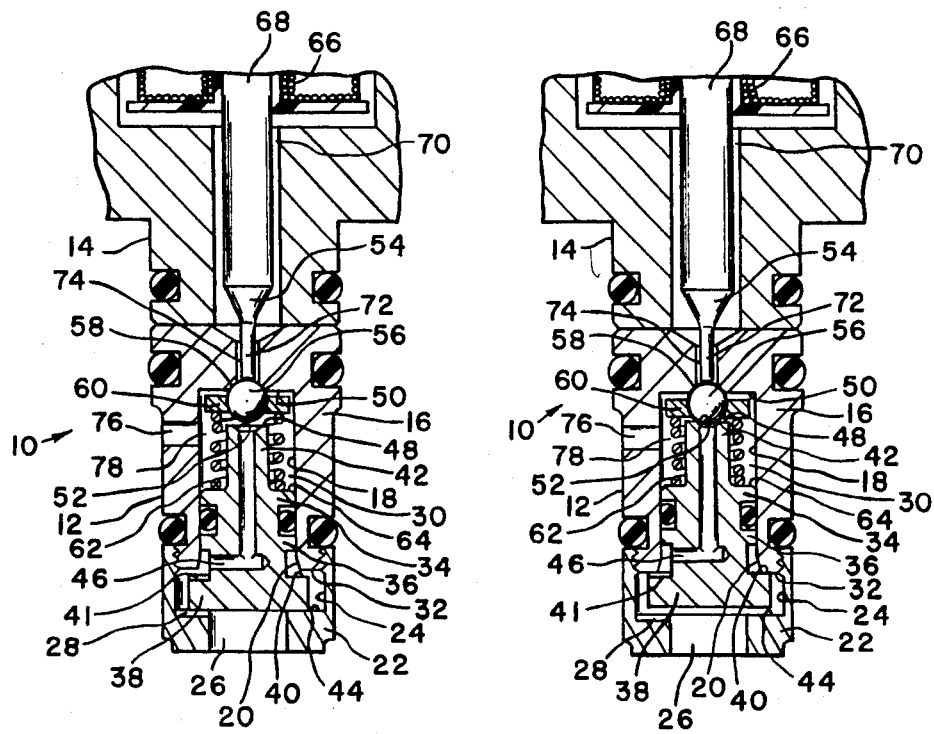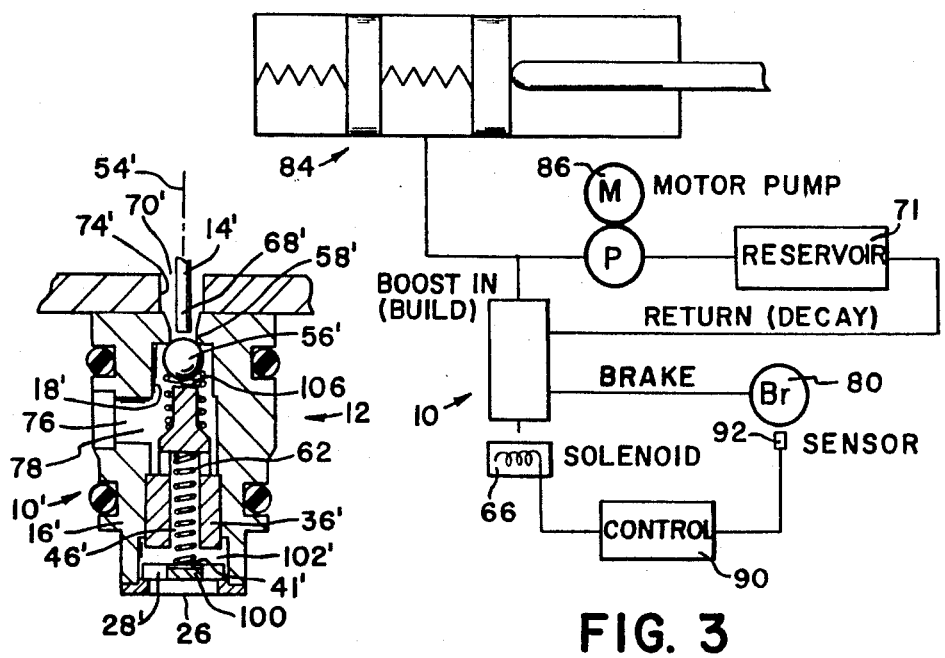

INTEGRATED THREE WAY AND ISOLATION SOLENOID VALVE

The present invention relates to valves for controlling the flow of a fluid such as hydraulic brake fluid and more particularly to a solenoid actuated valve which functions both as a three way valve and as an isolation valve, such a valve having particularly advantageous application in an anti-lock braking system.

In various fluid power systems there exists a need for controlling the application of pressurized fluid between a source of such fluid and an actuator. It has been a common practice to provide a solenoid valve and associated control devices to accomplish this purpose.

One particularly relevant application of such valves is an anti-lock braking system in which control of the application of pressurized fluid to brake cylinders (pressure build), release of pressurized brake fluid from the brake cylinders (decay), and isolation of the wheel cylinder from the source of pressurized fluid (isolation) are controlled by multiple solenoid valves and an electronic control device responsive to rotational movement of a vehicle wheel. Such a system is disclosed in numerous United States Patents and are now well known to those skilled in the art. It is apparent that the cost and reliability of such systems is adversely affected by the number of solenoid valves required to control the flow of braking fluid, the result of not only the number of valves required, but also the number of interconnecting fluid lines, solenoid control outputs, wiring, and the like. Accordingly, it is highly desirable to develop a solenoid actuated control valve for use in pressurized fluid systems which enables reduction of the number of solenoid valves required.

In its broader aspects, the invention is an integrated valve for use in a pressurized fluid system which includes a source of pressurized fluid such as a master cylinder or motor pump, an actuator such as a wheel cylinder, and a control system such an anti-lock control which generates control signals. The valve comprises generally a first valve element provided with a fluid passage therethrough communicating between inlet and outlet ports of a valve body and a second valve element such as a ball, poppet or flapper valve normally closing a decay port in the valve body and operable to an open position closing the fluid passage. The first valve element is movable to a second position closing the inlet port in response to differential pressure between the inlet and outlet ports and actuator means.

The first valve element may further include a bleed passage in parallel with the fluid passage such that pressurized fluid can pass from the inlet port to the outlet port at a reduced rate when the inlet port is otherwise closed. The first valve element and second valve elements are biased into their normal positions by an axially disposed spring. Typically the actuator is a solenoid having an armature axially movable and abuttingly engaged with the second valve element.

In a specific embodiment, the first valve element moves from its normally open position to its closed position in a direction towards said second valve element such that subsequent movement of the second valve element from its position closing the decay port to its second position closing the fluid passage and opening the decay port requires reduced travel.

The integrated valve assembly provides fluid communication between a source of pressurized fluid and an actuator in one operating state, between the outlet or decay port and a return reservoir of the source of pressurized fluid in a second operating state, and for isolation and controlled build of the actuator pressure in a third operating state.

It is therefore an object of the invention to provide an integrated solenoid actuated valve for controlling the application of pressurized fluid from a source to an actuator, isolation of the actuator from the source of pressurized fluid, and controlling the flow of pressurized fluid from the actuator to the return reservoir of the source.

It is another object of the invention to provide an improved solenoid actuated control valve for use in pressurized fluid systems such as an anti-lock braking system.

Still another object of the invention is to provide an integrated solenoid valve which can provide the functions of a plurality of solenoid valves.

Yet another object of the invention is to provide such a solenoid actuated valve which substantially reduces the cost and complexity of an anti-lock braking system.

BRIEF DESCRIPTION OF THE DRAWINGS

These and other objects, features and aspects of the invention will be more clearly understood and better described in conjunction with the following detailed description in conjunction with the appended drawings wherein:

FIGS. 1 and 2 are axial sectional views of an integrated three-way isolation solenoid valve in accordance with the invention and showing the valve members in the alternate operating states;

FIG. 3 is a schematic diagram of an anti-lock braking system incorporating a control valve in accordance with the invention; and FIG. 4 is an axial sectional view of an alternative embodiment of the invention.

DESCRIPTION OF THE PREFERRED EMBODIMENT

Referring now to the drawings and in particular to FIG. 1, there is shown an integrated three way control-isolation valve in accordance with the present invention indicated generally at 10 which includes a valve assembly 12 and a solenoid actuator 14.

Valve assembly 12 includes a valve body 16 having a cylindrical bore 18. End 20 of bore 18 may be chamfered. A valve body closure member 22 is similarly provided with a cylindrical bore 24 of greater diameter than bore 18. A fluid pressure inlet port 26 communicates with the bore 24 either directly or by means of a plurality of radial slots as at 28. Together, bore 18 and bore 24 define a valve chamber 30 and a valve seat 32.

A valve element 34 of stepped cylindrical configuration is provided with a central portion 36 disposed in a sliding fluid-tight engagement with bore 18, enlarged head portion 38, and an axially extending projection or neck portion 42. Element 34 is movable between a first position shown in FIG. 1 to a second position shown in FIG. 2 with its seating surface 40 in fluid sealing engagement with the seat 32. It will be observed that the axial dimension of portion 38 is less than the axial dimension of the chamber defined between the seat 32 and the bottom 44 of the closure member 22.

A fluid passage 46 extends through valve element 36 from a point adjacent and above (as viewed in the drawings) head portion 38 to the axial center of the neck 42.

End 48 of neck 42 is axially spaced-apart from the top 50 of bore 18 and is provided with a spherical ball valve seat 52 concentric with the valve axis 54.

A second valve element, shown as a ball valve element 56, is axially disposed in and movable in the space defined in the illustrated embodiment between the spherical valve seat 52 and a second spherical valve seat 58 formed in top 50. An annular spring seat 60 encircles ball valve element 56 and is secured thereto as by swaging, spring seat 60 also functioning to maintain the ball valve element 56 axially in the bore 18. A helical compression spring 62 is compressed between shoulder 64 of the valve element 34 and the spring seat 60.

Solenoid actuator 14 includes an electric coil 66 encircling an axially movable plunger 68. Plunger 68 extends through a fluid return passage 70 which communicates with a reservoir for low pressure fluid 71 (FIG. 3 only) and further includes a reduced diameter stem portion 72 which extends axially through a fluid decay port 74 which communicates between pressure fluid return passage 70 and the valve bore 18.

Pressurized fluid outlet port 76 communicates with the upper portion 78 of the bore 18. It will be observed that the valve element 36 is normally maintained in the position shown in FIG. 1 in response to force thereagainst by the spring 62. This same spring maintains the ball valve element 56 in fluid tight engagement with second valve seat 58. Under these conditions, pressurized fluid applied to the valve 10 via inlet port 26 passes through slots 28 and passage 46, between the ball valve element 56 and the first spherical valve seat 52 and out through outlet port 76 to an actuator, brake wheel cylinder 80, or the like. When the solenoid 66 is energized by an appropriate control signal, plunger 68 moves axially downwardly (as viewed in the drawings), stem 72 pushing the ball valve element 58 downwardly into engagement with the first spherical valve seat 52 against the force of the spring 62. This will simultaneously relieve pressure in the valve chamber 78 by reason of the decay port 72 being open and the ball valve element 56 stopping the flow of pressurized fluid. When pressure in chamber 78 reduces to a value less than the pressure of the pressurized fluid in inlet port 26 plus a pressure force value equal to the force exerted by spring 62 and when solenoid 14 is deenergized, valve element 34 will slide upwardly in the bore 18 to the position shown in FIG. 2. This brings the valve seat 40 into engagement with seating surface 32 thereby stopping or restricting fluid communication between the inlet port 26 and outlet port 76. It will be observed that the axial movement of the valve element 38 is less than the initial available axial movement of the ball valve element 56 such that when valve element 34 is in its upper position, ball valve element 56 is still capable of axial movement between a position closing the deacy port 74 and a position closing the fluid passage 46.

The valve element 36 will remain in its upper position as long as the force from pressure in chamber 78 plus the force exerted by the spring 62 is less than the force exerted by the pressurized fluid in inlet port 26 when solenoid 14 is deenergized. When solenoid 14 is energized, the additional force may momentarily overcome the differential pressure force. However, fluid flow is still shut off by ball valve element 56. Element 38 will return to its seat 38 when the solenoid 14 is released. The ball valve element 56 may now be cycled between opened and closed positions as desired by means of appropriate control signals to the solenoid 66. It will be noted that the stroke and corresponding movement of the ball valve element 56 is significantly reduced when the valve element 34 is in its upper position. Accordingly, while response of the valve will be slower during a first cycle when the element 34 moves from its lower to its upper position, the response speed of the valve will increase thereafter.

When the ball valve element 56 is seated against the second spherical valve seat 58, fluid pressure will rise at a controlled rate in the chamber 78 by reason of the fluid bleed passage 41. If the ball valve element remains seated against second spherical valve seat 56, the pressure in chamber 78 will eventually reach a pressure sufficient to allow spring 62 to force valve element 36 back to its lower position thereby reopening the fluid passage 46.

An application of the valve is illustrated in FIG. 3 wherein the valve is shown used in a "pumpback" type anti-lock braking system. In this system, pressurized brake fluid is normally applied to the brake wheel cylinder 80 through the valve 10 to a wheel cylinder. The source uses a master cylinder 84 to manually modulate fluid pressure. An electronic control 90, sensing a wheel locking condition via sensor 92, activates solenoid 66 causing the ball valve element 56 to move to its lower position. This initially isolates the pressure source from 84 and allows brake pressure in 80 to be reduced by flowing through 10 to 71. The ball valve element is then allowed to return to its position seated against second spherical valve seat 58. The valve element 36 then also moves to its upper position closing full flow to passage 46. Under these conditions, the brake wheel cylinder 80 is isolated from the master cylinder 84. Pressurized fluid is then supplied by a motor pump 86, drawing from reservoir 84. Subsequently sensed skid conditions will cause further cycling of the solenoid 66 and ball valve element 56 by the control 90 to thereby further reduce pressure as required. When the ball valve element remains seated on seat 58, a controlled rise in brake pressure will occur by means of the bleed port 41. If the brake pressure again reaches a level equal to the pressure of the pressurized fluid source without sensing a skid condition, valve element 36 will move back to its lower position thereby reestablishing direct full communication with the brake master cylinder 84. In the preceding description, valve element 56 has been disclosed as a ball valve. It will, however, be apparent to those skilled in the art that this element could also be provided as a flapper or a poppet valve, it being necessary only that the movable second valve element normally close the decay port 74 and close the fluid passage 46 when the valve is moved to its second operating state.

Other variations of the valve are also possible. One such variation as being shown in FIG. 4. In this figure, corresponding parts of the valve 10' are indicated by like primed numerals. In this embodiment, an annular disk 100 is reciprocably received in lower valve chamber 102'. Disk 100 is provided with a plurality of slots 28' in its perimeter, is maintained in its illustrated position by spring 62', and fluid tightly engages valve element 36' when the latter moves downwardly (as viewed in the drawings) in response to energization of the solenoid (not shown in FIG. 4), and movement of plunger stem 14'. Differential pressure will hold the disk 100 in sealing engagement with the valve element 36' to effect isolation and ball valve element 56' can be cycled as above. A bleed orifice is provided in disk 100 to effect controlled pressure build. Pressure decay cycling requires axial movement of both ball element 56' and valve element 36' or by providing clearance at 106 when element 36' is in its vertical extreme against shoulder 108. The valve 10' otherwise functions in the same manner as valve 10.

It will thus be seen that the single control/isolation valve of the present invention is able to perform functions of as many as three separate solenoid valves used in prior art systems which effect isolation build and bleed of brake pressure in an anti-lock brake system. Other applications will be obvious to those skilled in the art.

With the present invention, it has also been found that the configuration of the valve effects automatic cleaning of the bleed orifice 41 (41') thereby obviating a common problem in prior art valves of this type.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What is claimed is:

1. For use in an anti-lock braking system which includes a source of pressurized braking fluid, a wheel cylinder, and an anti-lock control means for generating brake control signals in response to behavior of the wheel, a control valve comprising: a valve body having a bore and inlet, outlet, and decay ports therein, a first valve element reciprocably received in said bore and having a fluid passage therethrough communicating between said inlet and outlet ports, a second valve element normally closing said decay port and operable to an open position and further to close said fluid passage and thereby cause a fluid pressure differential across said first valve element, said first valve element being movable in response to said fluid pressure differential to a second position closing said inlet port, and actuator means for moving said second valve element from said closed to said open position in response to said control signals.

2. The control valve of claim 1 further including spring means for maintaining said first valve element in said first position.

3. The control valve of claim 2 wherein said actuator means is an electric solenoid having a plunger, said plunger abuttingly engaging said second valve element.

4. The control valve of claim 3 wherein said inlet port and said decay port are disposed at axially opposite ends of said bore, said fluid passage extending axially through said first valve element, said second valve element being movable axially in said bore to close said fluid passage.

5. The control valve of claim 3 wherein said spring means further resiliently maintains said second valve element in said closed position.

6. The control valve of claim 5 wherein said bore includes an annular valve seat, said first valve element including an enlarged head portion fluid tightly engaging said annular valve seat when said first element is in said second position, said valve seat and said head portion closing said fluid passage.

7. The control valve of claim 1 further including a bleed orifice means communicating between said inlet and outlet ports for providing a reduced flow of pressurized fluid therebetween when said first valve element is in said second position.

8. The control valve of claim 7 wherein said bore includes an annular valve seat, said first valve element including an enlarged head portion fluid tightly engaging said annular valve seat when said first element is in said second position, said valve seat and said head portion closing said fluid passage said bleed orifice means including a groove formed in one of said annular valve seat and said head portion.

9. The control valve of claim 1 wherein said second valve element is a ball valve axially disposed in said bore, said fluid passage and said decay ports further defining co-axially disposed valve seats engaging said ball valve when in said open and normal positions, respectively.

10. For use in a pressure fluid system which includes a source of pressurized fluid, an actuator, and a control means for generating control signals, a control valve comprising: a valve body having a bore, a first valve element axially reciprocal in and dividing said bore into inlet and outlet chambers, a fluid passage extending through said valve element between said chambers, axially aligned fluid inlet and decay ports communicating with said inlet and outlet chambers, respectively, and a decay port communicating between said outlet chamber and said actuator, a second valve element movable from a first position closing said decay port to a second position closing said fluid passage and opening said decay port to relieve fluid pressure in said outlet chamber, said first valve element including a seat and being movable between a normally open position and a closed position wherein said seat closes said fluid passage in response to a predetermined differential pressure across said first valve element and actuator means for moving said second valve element between said first and said second positions thereof.

11. The control valve of claim 10 further including bleed orifice means for providing restricted fluid communication between said inlet and said outlet ports when said first valve element is in said second position.

12. The control valve of claim 10 further including spring means axially engaged between said second valve element and said first valve element or maintaining said second valve element and said first valve element in their normal positions.

13. The control valve of claim 10 wherein said second valve element is a ball valve axially movable in said cavity, said fluid passage extending axially through said first valve element adjacent said ball valve element, the movement of said ball valve from its normal position to said second position closing said fluid passage being shorter when said first valve element is in said second position thereof.

14. The control valve of claim 10 wherein said actuator means is an electric solenoid connected to receive and responsive to said control signals.

* * * * *